US008665760B2

(12) United States Patent
Sinivaara et al.

(10) Patent No.: US 8,665,760 B2
(45) Date of Patent: *Mar. 4, 2014

(54) METHOD AND ARRANGEMENT FOR CONNECTING AN AD-HOC COMMUNICATION NETWORK TO A PERMANENT COMMUNICATION NETWORK

(75) Inventors: Hasse Sinivaara, San Jose, CA (US); Pasi Auranen, Salo (FI)

(73) Assignee: Savox Communications Oy AB (Ltd), Espoo (FI)

( * ) Notice: Subject to any disclaimer, the term of this patent is extended or adjusted under 35 U.S.C. 154(b) by 573 days.

This patent is subject to a terminal disclaimer.

(21) Appl. No.: 12/863,507

(22) PCT Filed: Jan. 22, 2008

(86) PCT No.: PCT/FI2008/000013
§ 371 (c)(1),
(2), (4) Date: Oct. 7, 2010

(87) PCT Pub. No.: WO2009/092843
PCT Pub. Date: Jul. 30, 2009

(65) Prior Publication Data
US 2011/0085475 A1     Apr. 14, 2011

(51) Int. Cl.
*H04B 7/00* (2006.01)
(52) U.S. Cl.
USPC ........... 370/277; 370/227; 370/338; 370/357; 370/432; 370/350; 375/346; 375/350; 455/41.2; 455/90.2; 455/519
(58) Field of Classification Search
USPC ............ 370/432, 346, 249.35, 227, 338, 352, 370/357, 355; 709/238; 375/0.346, 350; 455/41.2, 90.2, 518, 519, 524
See application file for complete search history.

(56) References Cited

U.S. PATENT DOCUMENTS 5,404,577 A * 4/1995 Zuckerman et al. ......... 455/66.1
6,121,881 A * 9/2000 Bieback et al. ............ 340/573.1
(Continued)

FOREIGN PATENT DOCUMENTS

WO    WO 03/077503    9/2003

OTHER PUBLICATIONS

Kortuem G et al: "When Cyborgs meet: building communities of cooperating wearable agents", Wearable Computers, 1999. Digest of Papers, Oct. 18, 1999, pp. 124-132, XP010360105.

(Continued)

*Primary Examiner* — Andrew Lai
*Assistant Examiner* — Andrew C Lee
(74) *Attorney, Agent, or Firm* — Young & Thompson

(57) ABSTRACT

A method and arrangement for connecting an ad-hoc communication network (101) to a permanent communication network (102), e.g. to a cellular mobile communication network. The ad-hoc communication network is established between communication devices (103-106) and a gateway device (107) using a routing protocol that is run in the gateway device and in the communication devices. A protocol address that is associated in a communication device with a protocol data unit is determined on the basis of a control action given by a user of the communication device. In a gateway device, the protocol data unit is relayed to the permanent communication network if the protocol data unit is provided with a pre-determined protocol address. The user of the communication device can determine with the aid of the control action whether he is communicating only inside the ad-hoc communication network or via the permanent communication network.

30 Claims, 9 Drawing Sheets

(56) References Cited

U.S. PATENT DOCUMENTS

| | | | |
|---|---|---|---|
| 6,687,245 B2* | 2/2004 | Fangman et al. | 370/356 |
| 6,725,053 B2* | 4/2004 | Rosen et al. | 455/518 |
| 6,791,944 B1* | 9/2004 | Demetrescu et al. | 370/235 |
| 7,006,472 B1* | 2/2006 | Immonen et al. | 370/332 |
| 7,107,017 B2* | 9/2006 | Koskelainen et al. | 455/90.2 |
| 7,508,840 B2* | 3/2009 | Delaney | 370/466 |
| 7,747,269 B2* | 6/2010 | Brewer et al. | 455/518 |
| 7,865,207 B2* | 1/2011 | Malomsoky et al. | 455/519 |
| 8,194,681 B2* | 6/2012 | Kaarela et al. | 370/401 |
| 8,223,729 B2* | 7/2012 | Raju et al. | 370/338 |
| 2002/0008625 A1* | 1/2002 | Adams et al. | 340/573.1 |
| 2002/0118656 A1 | 8/2002 | Agrawal et al. | |
| 2003/0165121 A1 | 9/2003 | Leung | |
| 2003/0224825 A1 | 12/2003 | Cox et al. | |
| 2003/0228842 A1* | 12/2003 | Heinonen et al. | 455/41.2 |
| 2004/0018839 A1 | 1/2004 | Andric et al. | |
| 2004/0120309 A1* | 6/2004 | Kurittu et al. | 370/352 |
| 2005/0025182 A1* | 2/2005 | Nazari | 370/469 |
| 2005/0105511 A1* | 5/2005 | Poikselka | 370/352 |
| 2005/0165957 A1* | 7/2005 | Choi et al. | 709/238 |
| 2005/0188029 A1 | 8/2005 | Asikainen et al. | |
| 2005/0243787 A1 | 11/2005 | Hong et al. | |
| 2006/0009970 A1* | 1/2006 | Harton et al. | 704/231 |
| 2006/0048286 A1* | 3/2006 | Donato | 2/422 |
| 2006/0158329 A1* | 7/2006 | Burkley et al. | 340/539.13 |
| 2006/0171389 A1* | 8/2006 | Hasegawa | 370/390 |
| 2006/0221912 A1* | 10/2006 | Olivier et al. | 370/338 |
| 2006/0274741 A1 | 12/2006 | Wing et al. | |
| 2006/0286933 A1* | 12/2006 | Harkins et al. | 455/41.2 |
| 2007/0213088 A1* | 9/2007 | Sink | 455/524 |
| 2007/0274460 A1* | 11/2007 | Shaffer et al. | 379/37 |
| 2008/0075261 A1* | 3/2008 | Ramanathan et al. | 379/220.01 |
| 2008/0247373 A1* | 10/2008 | Synnergren et al. | 370/340 |
| 2009/0129301 A1* | 5/2009 | Belimpasakis | 370/310 |
| 2009/0174547 A1* | 7/2009 | Greene et al. | 340/539.13 |
| 2009/0207852 A1* | 8/2009 | Greene et al. | 370/465 |

OTHER PUBLICATIONS

European Search Report, dated May 6, 2011, in EP 08701700.
International Search Report, PCT/FI2008/000013, Oct. 23, 2008.
European Office Action dated Apr. 20, 2012, from corresponding EP application.

* cited by examiner

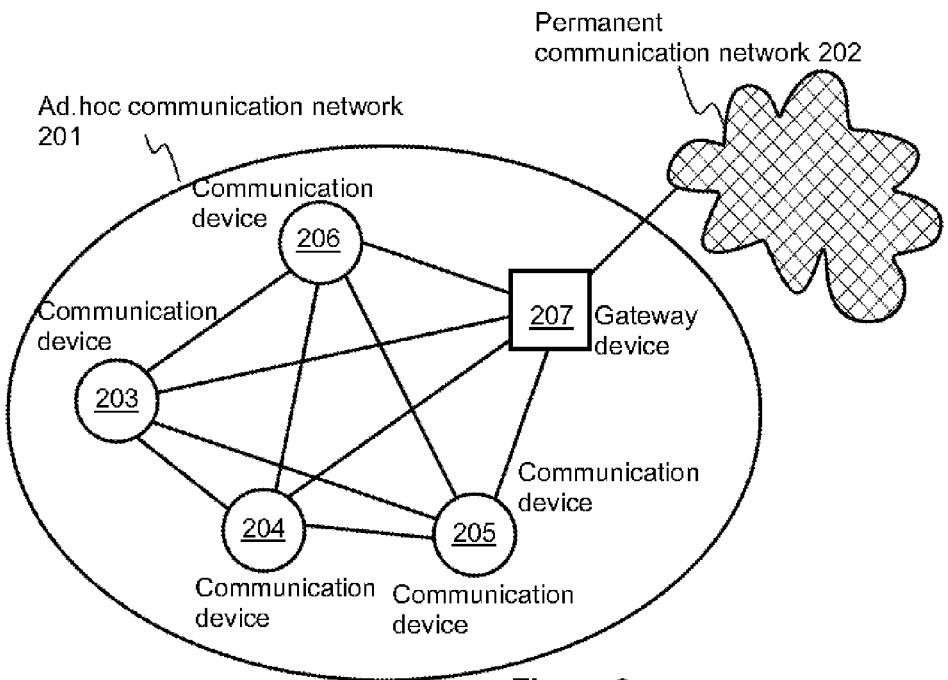
Figure 2a
Amended

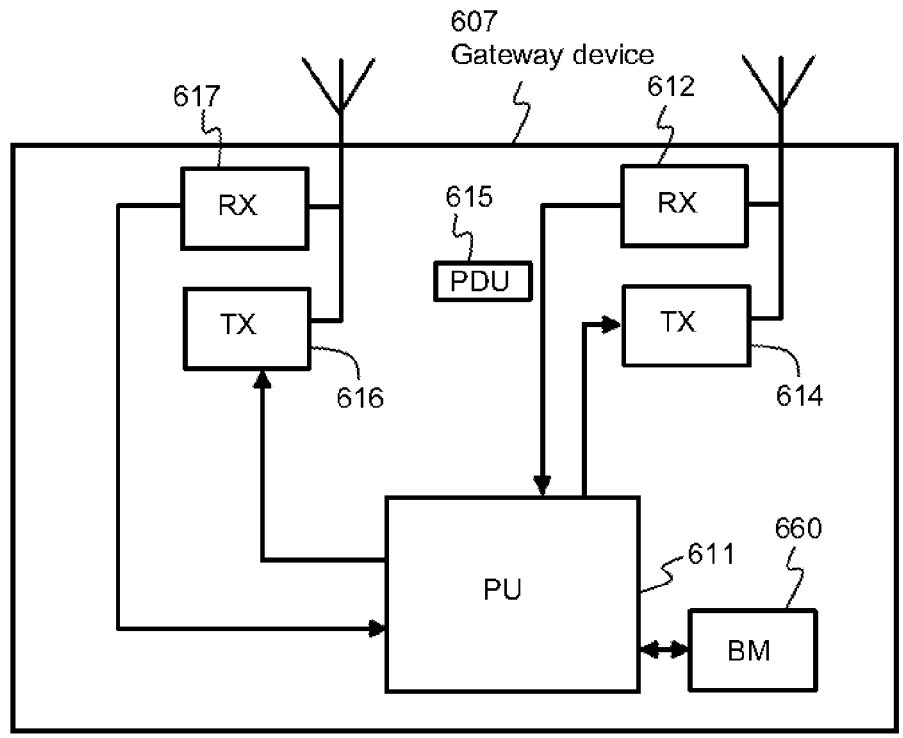
Figure 6a
Amended

METHOD AND ARRANGEMENT FOR CONNECTING AN AD-HOC COMMUNICATION NETWORK TO A PERMANENT COMMUNICATION NETWORK

FIELD OF THE INVENTION

The invention relates generally to a method and arrangement for connecting an ad-hoc communication network to a permanent communication network. The invention further relates to a communication device, to a wearable or handheld apparatus, e.g. a breathing protection apparatus, comprising a communication device, and to a gateway device capable of connecting an ad-hoc communication network to a permanent communication network.

BACKGROUND

Portable equipment, e.g. a handheld device or a wearable device such as a breathing mask, can be equipped with or connected to a communication device in order to enable the wearer of the equipment to communicate with other persons. The communication device comprises typically a microphone and an audio amplifier and/or a radio transceiver; additionally the communication device may comprise a display unit. For example, a fire fighter wearing a breathing mask has to be able to communicate with other fire fighters and with fire chiefs and/or images and videos may be broadcasted between communication devices. Typically communication can be voice, data, and/or image/video communication. Additionally, data can be digitally packetized audio, video and/or image. Members of an operational team such as fire fighters constitute an ad-hoc communication group within which all the members have to be able to communicate with all other members of the operational team. The members of the operational team may use, for example, short range radio transceivers for communication within the operational team. Furthermore, a member of an operational team has to be able to communicate with persons outside the operational team. For example, a fire fighter may have a need to communicate with personnel located outside incident or operating area. Generally, the said personnel can be situated so far from the place in which the fire fighters are operating that usually a permanent, not an ad-hoc, communication network is needed for providing communication connections between the fire fighters and the personnel outside incident or operating area. The permanent communication network can be, for example, a mobile communication network or a landline network.

Publication WO2006136992 discloses a method and apparatus for establishing a virtual ad-hoc network. First, under the assistance of a cellular mobile communication network, a plurality of point-to-point enabled communication devices performs multicast connectivity testing. Then, a group of communication devices that can communicate directly with each other are determined from the plurality of the communication devices according to the multicast connectivity testing result and the cellular mobile communication network allocates radio resources to the group of communication devices for performing virtual ad-hoc network communication. Next, the sending orders for each communication device in the group of communication devices are determined on the basis of the principle that only one communication device is allowed to use the radio resources to send data at a time. Finally, the communication devices are arranged to transfer data in the determined sending orders via the point-to-point direct links between them by utilizing the same radio resources. The object of the above-described solution disclosed in WO2006136992 is to implement a system that is able to provide an ad-hoc multicast network for applications similar to real-time communication between multiple persons. There is, however, a need for a system that is able to provide an ad-hoc communication network such that a person using the ad-hoc communication network can also, if desired, communicate via a permanent network, e.g. via a cellular mobile communication network and/or a landline network, when communicating in the ac-hoc network.

SUMMARY

In accordance with a first aspect of the invention, there is provided a new arrangement for connecting an ad-hoc communication network to a permanent communication network. The arrangement comprises:
a communication device that includes a processor unit arranged to run a routing protocol for including the communication device into the ad-hoc communication network, a control interface arranged to receive a predetermined control action given by a user of the communication device, a circuitry arranged to create a protocol data unit, and a transmitter arranged to transmit the protocol data unit to the ad-hoc communication network, and
a gateway device that includes a processor unit arranged to run the routing protocol for including the gateway device into the ad-hoc communication network, a receiver arranged to receive the protocol data unit, and a transmitter capable of relaying data carried by the protocol data unit to the permanent communication network,
wherein the processor unit of the communication device is arranged to provide the protocol data unit with a pre-determined protocol address as a response to the pre-determined control action, and otherwise, to provide the protocol data unit with another protocol address, and the processor unit of the gateway device is arranged to relay the data carried by the protocol data unit to the permanent communication network as a response to a situation in which the protocol data unit is provided with the pre-determined protocol address.

The routing protocol can be for example an IP-unicast routing protocol or an IP-multicast routing protocol (Internet Protocol). A user of the communication device can determine with the aid of the pre-determined control action whether he is communicating only inside the ad-hoc communication network or via the permanent communication network. The permanent communication network can be, for example, a mobile communication network or a landline network.

The data carried by the protocol data unit can be relayed to the permanent communication network for example by relaying the protocol data unit, e.g. an IP-packet, as such to the permanent communication network if the permanent communication network is able to support the protocol data unit, or by converting the data to a format which is supported by the permanent communication network e.g. digital-to-analog conversion or analog-to-digital conversion and/or digital encryption to a digital PCM-format (Pulse Coded Modulation). In other words, the relaying of the data to the permanent communication network may comprise conversion of the format of the data.

The circuitry of the communication device that is arranged to create the protocol data unit can comprise, for example, an acoustical transducer (e.g. a microphone), an analog-to-digital converter, an encoder, and a framer unit arranged to packetize a digital data stream into successive protocol data units.

The circuitry may further comprise e.g. a speaker element, a decoder, a modem, a telemetry data interface, a streaming video interface, and/or an encryption/decryption means. The physical implementation can comprise e.g. an external headset or another audio interface that allows handsfree operation.

In accordance with a second aspect of the invention, there is provided a new communication device. The communication device comprises:
- a processor unit arranged to run a routing protocol for including the communication device into an ad-hoc communication network,
- a control interface arranged to receive a pre-determined control action given by a user of the communication device,
- a circuitry arranged to create a protocol data unit, and
- a transmitter arranged to transmit the protocol data unit to the ad-hoc communication network, wherein the processor unit is arranged to provide the protocol data unit with a predetermined protocol address as a response to the pre-determined control action, and otherwise, to provide the protocol data unit with another protocol address.

A communication device according to an embodiment of the invention may further comprise a receiver arranged to receive protocol data units from the ad-hoc communication network, or means for connecting the communication device to an external receiver device. In a physical implementation, the transmitter and the receiver can be realised as a combined transceiver element.

In accordance with a third aspect of the invention, there is provided a new gateway device. The gateway device comprises:
- a processor unit arranged to run a routing protocol for including the gateway device into an ad-hoc communication network,
- a receiver arranged to receive a protocol data unit from the ad-hoc communication network, and
- a transmitter capable of relaying data carried by the protocol data unit to a permanent communication network, wherein the processor unit is arranged to relay the data carried by the protocol data unit to the permanent communication network as a response to a situation in which the protocol data unit is provided with a pre-determined protocol address.

A gateway device according to an embodiment of the invention may further comprise e.g. a transmitter arranged to send protocol data units to the ad-hoc communication network, a receiver arranged to receive data from the permanent communication network, a circuitry arranged to convert and/or to packetize data received from the permanent communication network into protocol data units supported by the ad-hoc communication network, and/or an audio interface for enabling communication via the ad-hoc communication network and/or via the permanent communication network.

In accordance with a fourth aspect of the invention, there is provided a new breathing protection apparatus. The breathing protection apparatus comprises a breathing mask and a communication device that includes:
- a processor unit arranged to run a routing protocol for including the communication device into an ad-hoc communication network,
- a control interface arranged to receive a pre-determined control action given by a user of the communication device,
- a circuitry arranged to create a protocol data unit, and
- a transmitter arranged to transmit the protocol data unit to the ad-hoc communication network, wherein the processor unit is arranged to provide the protocol data unit with a predetermined protocol address as a response to the pre-determined control action and otherwise to provide the protocol data unit with another protocol address.

A breathing protection apparatus according to an embodiment of the invention may further comprise e.g. an audio interface or means for connecting to an external audio interface. A breathing protection apparatus according to an embodiment of the invention may further comprise e.g. a telemetry interface to relay local telemetry data and/or a video/image interface to relay still images or a live video stream from one or more cameras.

The control interface can be equipped e.g. with a speech detector. For example, a first pre-determined voice command can be used for representing a beginning of the pre-determined control action and a second pre-determined voice command can be used for representing an end of the pre-determined control action.

In accordance with a fifth aspect of the invention, there is provided a new method for connecting an ad-hoc communication network to a permanent communication network. The method comprises:
- running a routing protocol in a communication device and in a gateway device for including the communication device and the gateway device into the ad-hoc communication network,
- creating a protocol data unit in the communication device,
- in the communication device, providing the protocol data unit with a predetermined protocol address as a response to a pre-determined control action, and otherwise, providing the protocol data unit with another protocol address,
- transmitting the protocol data unit from the communication device to the gateway device via the ad-hoc communication network, and
- in the gateway device, relaying data carried by the protocol data unit to the permanent communication network as a response to a situation in which the protocol data unit is provided with the pre-determined protocol address.

A benefit provided by embodiments of the present invention when compared with prior art solutions of the kind described above is that a user of a communication device that is a part of an ad-hoc communication network can determine with the aid of a pre-determined control action whether he is communicating only within the ad-hoc communication network or via a permanent communication network. Various embodiments of the invention both as to constructions and to methods of operation, together with additional objects and advantages thereof, will be best understood from the following description of specific embodiments when read in connection with the accompanying drawings.

The embodiments of the invention presented in this document are not to be interpreted to pose limitations to the applicability of the appended claims. The verb "to comprise" is used in this document as an open limitation that does not exclude the existence of also unrecited features. The features recited in depending claims are mutually freely combinable unless otherwise explicitly stated.

BRIEF DESCRIPTION OF THE FIGURES

Embodiments of the invention presented in the sense of examples and their advantages are explained in greater detail below with reference to the accompanying drawings, in which FIGS. 2a and 2b show exemplifying connection topologies in an ad-hoc communication network that can be connected to a permanent communication network with an arrangement according to an embodiment of the invention, FIG. 6a shows a block diagram of a gateway device according to an embodiment of the invention.

DESCRIPTION OF THE EMBODIMENTS

Figure 1:
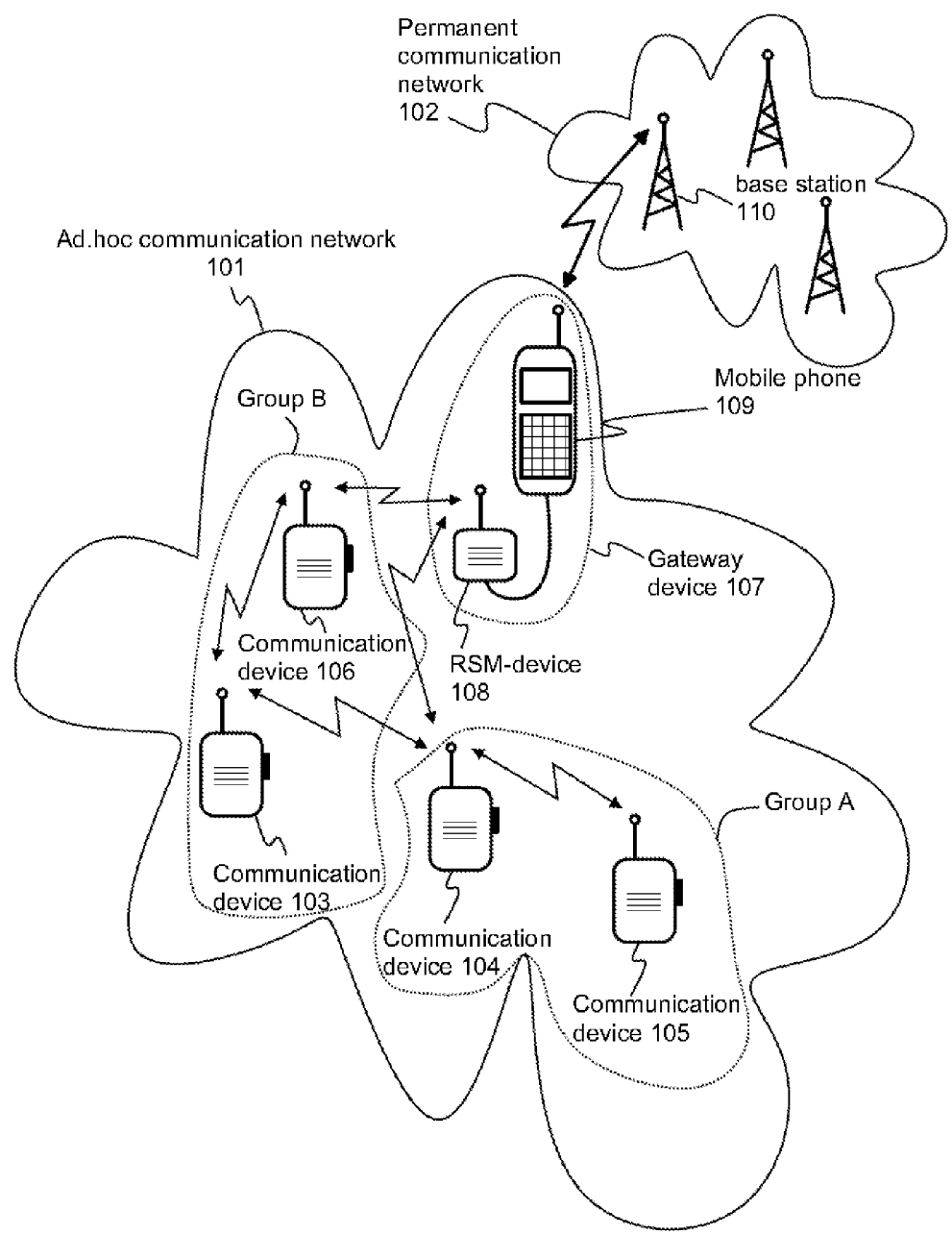
FIG. 1 shows a high-level diagram of an arrangement according to an embodiment of the invention for connecting an ad-hoc communication network to a permanent communication network.

FIG. 1 shows a high-level diagram of an arrangement according to an embodiment of the invention for connecting an ad-hoc communication network 101 to a permanent communication network 102. The permanent communication network can be for example a mobile communication network, a landline network, or a combination of them. The arrangement comprises communication devices 103-106 and a gateway device 107. Each communication device comprises a processor unit that is arranged to run a routing protocol for including the communication device into the ad-hoc communication network 101. The communication device comprises a control interface that is arranged to receive a pre-determined control action from a user of the communication device. The communication device comprises a circuitry arranged to create protocol data units, and a radio transmitter arranged to transmit the protocol data units to the ad-hoc communication network. The processor unit of the communication device is arranged to provide a protocol data unit with a pre-determined protocol address as a response to the predetermined control action, and otherwise, to provide the protocol data unit with another protocol address. The user of the communication device can determine with the aid of the pre-determined control action whether a protocol data unit is provided with the pre-determined protocol address or with some other protocol address.

The routing protocol can be a unicast routing protocol or a multicast routing protocol. A protocol address can be e.g. a destination address (DA) associated with a protocol data unit or a multicast address (MA) associated with a protocol data unit. A unicast routing protocol can be e.g. an IP-unicast routing protocol. Correspondingly, a multicast routing protocol can be e.g. an IP-multicast routing protocol. For example, RIP (Routing Information Protocol), OSPF-protocol (Open Shortest Path First), IGMP (Internet Group management Protocol), and PIM-SM (Protocol Independent Multicast—Sparse Mode) can be used for controlling unicast and/or multicast operations performed in the communication devices 103-106 and in the gateway device 107.

The circuitry that is arranged to create the protocol data units can comprise means for packetizing audio data into successive protocol data units. The means for packetizing audio data can comprise, for example, a microphone, an analog-to-digital converter, an encoder, and a framer unit arranged to packetize a digital data stream into successive protocol data units. The circuitry can comprise also means for packetizing image, video and/or some other kind of data into successive protocol data units. The protocol data units can be, for example, IP-packets (Internet protocol), Frame relay frames, or Ethernet frames.

The gateway device 107 comprises a processor unit that is arranged to run the routing protocol for including the gateway device into the ad-hoc communication network. The gateway device comprises a radio receiver that is arranged to receive protocol data units from the ad-hoc communication network. The gateway device comprises a radio transmitter that is capable of relaying data carried by the protocol data unit to the permanent communication network 102. In the arrangement shown in FIG. 1 the gateway device is connected via a radio link to a base station 110 of a mobile communication network. The processor unit of the gateway device is arranged to relay the data carried by the protocol data unit that is received from the ad-hoc communication network 101 to the permanent communication network 102 as a response to a situation in which the protocol data unit is provided with the pre-determined protocol address. Therefore, a user of a communication device can determine with the aid of the above-mentioned pre-determined control action whether he is communicating only inside the ad-hoc communication network 101 or via the permanent communication network 102. The relaying of the data to the permanent communication network may comprise conversion of the format of the data to a form that is supported by the permanent communication network.

In an arrangement according to an embodiment of the invention, the routing protocol is a multicast routing protocol, the predetermined protocol address is a first multicast address, and another protocol address is a second multicast address. The communication devices 103-106 are configured to be destinations for those protocol data units that are provided with the second multicast address and the gateway device 107 is configured to be a destination for those protocol data units that are provided with the first multicast address. In this case, a user of a communication device 103, 104, 105, or 106 transmits data either to users of the other communication devices or to a recipient that can be contacted via the permanent network 110. Protocol data units that carry data received from the permanent communication network are preferably provided with the second multicast address, so the communication devices are configured to be destinations for these protocol data units. The gateway device can be configured to perform a possibly needed protocol conversion between the ad-hoc communication network and the permanent communication network, and to provide the protocol data units that carry data received from the permanent communication network with the second multicast address.

The communication devices 103-106 and the gateway device 107 can be configured to ignore the payload content of those protocol data units that are received in a communication device or in the gateway device but for which the communication device or the gateway device is not configured to be a destination. A communication device or the gateway device can operate as a relaying device that is configured to forward a received protocol data unit to another communication device or to the gateway device irrespective whether or not the communication device or the gateway device that is operating as the relaying device is configured to be a destination of the received protocol data unit. In the exemplifying situation shown in FIG. 1, the gateway device 107 is out of the reach of communication devices 103 and 105. For example, a protocol data unit originated from the communication device 105 can be delivered to the gateway device via the communication device 104.

In an arrangement according to another embodiment of the invention in which the routing protocol is a multicast routing protocol, the communication devices 103-106 are configured to be destinations for those protocol data units that are provided with the second multicast address and both the communication devices 103-106 and the gateway device 107 are configured to be destinations for those protocol data units that are provided with the first multicast address. In this case, a user of a communication device 103, 104, 105, or 106 transmits data either to users of the other communication devices or both to the users of the other communication devices and to a recipient that can be contacted via the permanent network 110. Protocol data units that carry data received from the permanent communication network are preferably provided with the second multicast address, so the communication devices are configured to be destinations for these protocol data units. In an arrangement according to an embodiment of the invention in which the routing protocol is a multicast routing protocol, the communication devices 103-106 are divided into two groups A and B. The communication devices 103-106 are configured to be destinations for those protocol data units that are provided with the second multicast address. Communication devices belonging to the group A and the gateway device 107 are configured to be destinations for those protocol data units that are provided with the first multicast address. In this case, a user of a communication device 103, 104, 105, or 106 transmits data either to users of the other communication devices 103-106 or to users of other communication devices that belong to the group A and to a recipient that can be contacted via the permanent network 110. Protocol data units that carry data received from the permanent communication network can be provided with the second multicast address or with the first multicast address. The communication devices 103-106 are configured to be destinations for protocol data units that carry data received from the permanent communication network and are provided with the second multicast address. The communication devices belonging to the group A are configured to be destinations for protocol data units that carry data received from the permanent communication network and are provided with the first multicast address. In an arrangement according to an embodiment of the invention the gateway device 107 is arranged to determine, on the basis of data received form the permanent communication network, whether a protocol data unit that carries the above-mentioned data is provided with the first multicast address or with the second multicast address. Therefore, a person who is transmitting data to the ad-hoc communication network through the permanent communication network is able to determine whether the data is delivered to users of all the communication devices 103-106 or only to users of the communication devices belonging to the group A.

Using different multicast addresses it is possible to arrange different multicast groups within the ad-hoc communication network. Different multicast groups can be mutually overlapping or non-overlapping. The control interface of a communication device has to be, however, able to produce as many distinct control indications as there are different multicast addresses in use. When the number of different multicast addresses is two (the first multicast address and the second multicast address) a binary valued control indication is sufficient (a pre-determined control action is effective or it is not effective).

In an arrangement according to an embodiment of the invention the routing protocol is a unicast routing protocol, the predetermined protocol address is an address of the gateway device 107, and the other protocol address is an address of one of the communication devices 103-106. A communication device 103, 104, 105, or 106 is arranged to send copies of the protocol data unit as successive transmissions to the other communication devices and to the gateway device a response to the pre-determined control action, and otherwise, to transmit the copies of the protocol data unit only to the other communication devices.

In an arrangement according to an embodiment of the invention the routing protocol is a unicast routing protocol, the predetermined protocol address is an address of the gateway device 107, and the other protocol address is an address of one of the communication devices 103-106. A communication device 103, 104, 105, or 106 is arranged to send copies of the protocol data unit as successive transmissions to those other communication devices that are selected by a user of the transmitting communication device and to the gateway device a response to the pre-determined control action, and otherwise, to transmit the copies of the protocol data unit only to the selected other communication devices. Therefore, the user of the transmitting communication device can communicate, for example, with only one other user of a communication device or only with/via the gateway device depending on the selections made by him/her.

In an arrangement according to an embodiment of the invention both a unicast routing protocol and a multicast routing protocol are used. For example, the multicast routing protocol can be used for controlling communication between the ad-hoc communication network 101 and the permanent communication network 102, and the unicast routing protocol can be used for controlling communication within the ad-hoc communication network 101. The predetermined protocol address can be a pre-determined multicast address and the other protocol address can be a unicast address of one of the communication devices 103-106 or of the gateway device 107.

It should be noted that the above-described principle for connecting the ad-hoc communication network 101 to the permanent communication network 102 can be applied with many different routing schemes and routing protocols and the above-described routing schemes are presented only in the sense of examples.

In an arrangement according to an embodiment of the invention the control interface of a communication device 103, 104, 105, or 106 comprises a push button and pressing of the push button is arranged to represent the pre-determined control action.

In an arrangement according to an embodiment of the invention the control interface of a communication device 103, 104, 105, or 106 comprises a speech detector and a first pre-determined voice command is arranged to represent a beginning of the pre-determined control action and a second pre-determined voice command is arranged to represent an end of the pre-determined control action. The first predetermined voice command can be e.g. pronouncing the phrase: "START OUTSIDE" and second pre-determined voice command can be e.g. pronouncing the phrase: "END OUTSIDE".

In an exemplifying arrangement according to an embodiment of the invention the gateway device 107 can comprise an RSM-device (Remote Speaker Microphone) 108 and a mobile phone 109 that are connected to each other. The RSM-device includes the processor unit and the receiver arranged to receive protocol data units from the ad-hoc communication network. The mobile phone includes the transmitter capable of relaying data received from the ad-hoc communication network to the permanent communication network. The RSM-device is connected to the mobile phone through a wired or wireless connection. The communication devices 103-106 and the RSM-device include means for establishing a short range radio link network e.g. WLAN (Wireless Local Area Network) that is used in an ad-hoc mode. The communication devices 103-106 and RSM device 108 form an ad-hoc group. Ad-hoc group parameters can be pre-configured to the communication devices and to the RSM-device or e.g. an RFID-card (Radio Frequency Identification) can be used to exchange the parameters to the to the communication devices and to the RSM-device. Networking parameters may include such multicast/broadcast grouping that all the communication devices and the gateway device can belong to a same network (subnet or channel, multicast group). Basic idea is that the communication devices are communicating to each other through multicast/broadcast i.e. each communication device is configured as a destination to a specific address for any protocol data unit.

In an arrangement according to an embodiment of the invention at least one of the communication devices 103-106 is integrated with a breathing protection apparatus or with another wearable or handheld apparatus.

In an arrangement according to an embodiment of the invention the routing protocol is an IP-multicast protocol (Internet Protocol) and the protocol data unit is an IP-packet. IGMP (Internet Group management Protocol) and PIM-SM (Protocol Independent Multicast—Sparse Mode) can be used for controlling multicast operations performed in the communication devices 103-106 and in the gateway device 107.

In an arrangement according to an embodiment of the invention the communication devices 103-106 are arranged to support full-duplex communication with each other and with the gateway device 107. The gateway device is arranged to support full-duplex communication with the permanent communication network 102.

In an arrangement according to an embodiment of the invention the gateway device 107 is arranged to support half-duplex communication with the permanent communication network 102. The gateway device can be in a half-duplex transmission mode or in a half-duplex listening mode. In the half-duplex transmission mode the gateway is enabled to transmit data to the permanent communication network and in the half-duplex listening mode the gateway device is enabled to receive data from the permanent communication network. When the gateway device is in the half-duplex listening mode it is not possible to transmit data to the permanent communication network via the gateway device. The communication devices 103-106 can be arranged to support full-duplex communication or half-duplex communication with each other and/or with the gateway device. The processor unit of the gateway device is arranged:

to relay data that is received from a communication device 103, 104, 105, or 106 to the permanent communication network 102, if a protocol data unit carrying the said data is provided with the pre-determined protocol address and the gateway device is in the half-duplex transmission mode with respect to the permanent communication network, and to send to the communication device an indication of channel unavailability, if the protocol data unit is provided with the pre-determined protocol address and the gateway device is in the half-duplex listening mode with respect to the permanent communication network.

The processor unit of the gateway device can be further arranged:

to store an indicator of an attempted message (i.e. an indicator of a request for channel access) into a buffer memory of the gateway device, if the protocol data unit is provided with the pre-determined protocol address and the gateway device is in the half-duplex listening mode with respect to the permanent communication network, and to send to the communication device an indication of channel availability, if the buffer memory contains the indicator of attempted message and the gateway device is switched from the half-duplex listening mode to the half-duplex transmission mode with respect to the permanent communication network.

On the basis of the channel unavailability indicator a user of the communication device is able to know that, for the moment, it is not possible to transmit data to the permanent communication network. On the basis of the channel availability indicator a user of the communication device is able to know that it is again possible to transmit data to the permanent communication network.

The gateway device can be further arranged to set channel access priorities for communication devices trying to access the permanent communication network. The channel access priorities can be set e.g. based on order of requests for channel access (first in, first out) or the channel access priorities can be defined as per communication device or the channel access priorities can be given to the communication devices by casting lots. Temporally successive indications of channel availability are sent to users of different communication devices in a temporal order determined by the channel access priorities of the respective communication devices.

The gateway device can be further arranged to set priority between outgoing calls from the ad-hoc communication network to the permanent communication network and incoming calls from the permanent communication network to the ad-hoc communication network. The incoming calls have preferably a better priority than the outgoing calls for example in such a way that:

the gateway device is switched to the half-duplex listening mode with respect to the permanent communication network as a response to a situation in which the gateway device receives data from the permanent communication network, the gateway device is kept in the half-duplex listening mode with respect to the permanent communication network as long as the gateway device receives data from the permanent communication network in spite of the fact that the gateway device may simultaneously receive data also from the ad-hoc communication network, and the gateway device is switched to the half-duplex transmission mode with respect to the permanent communication network as a response to a situation in which the gateway device receives data only from the ad-hoc communication network.

It is also possible that the outgoing calls have a better priority than the incoming calls.

Figure 2B:
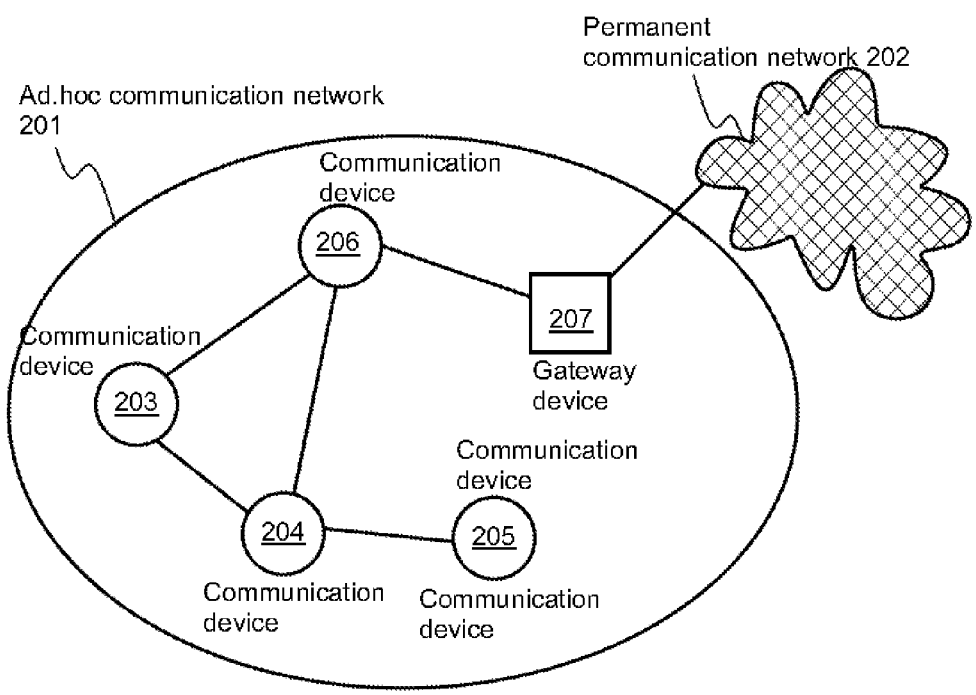

FIGS. 2*a* and 2*b* show exemplifying connection topologies in an ad-hoc communication network that can be connected to a permanent communication network with an arrangement according to an embodiment of the invention. In FIGS. 2*a* and 2*b* circles 203-206 represent communication devices and a square 207 represents the gateway device. The communication devices and the gateway device constitute an ac-hoc communication network 201 that is connected to a permanent network 202 via the gateway device.

In the situation shown in FIG. 2*a*, every communication device 203-206 and the gateway device 207 are within the reach of every other communication device and the gateway device. In other words, there is a full mesh connection topology in the ad-hoc communication network 201. For example if, the communication device 203 transmits a protocol data unit, all other communication devices 204-206 and the gateway device 207 are able to receive the said protocol data unit. In this case, the routing and forwarding information, e.g. routing and forwarding tables, maintained in the communication devices and in the gateway device indicates that there is no need to transmit a received protocol data unit further from any communication device and from the gateway device.

In the situation shown in FIG. 2b, there is no full mesh connection topology in the ad-hoc communication network 201. In this case, the routing and forwarding information maintained in the communication devices and in the gateway device may indicate, for example, that a protocol data unit that is originated by the communication device 206 and is received in the communication device 204 shall be further transmitted from the communication device 204. The connection topology can change dynamically. Known dynamical routing protocols can be used for keeping the routing and forwarding information, e.g. routing and forwarding tables, of the communication devices and the gateway device in touch with changes of the connection topology. Any communication device can relay protocol data units received from a communication device or from the gateway device to other communication devices and to the gateway device depending on the instantaneous connection topology of the ad-hoc communication network. Correspondingly, the gateway device can relay protocol data units received from a communication device to other communication devices. Protocol data units carrying data that is received from the permanent communication network 202 can be treated in the same fashion within the ad-hoc communication network 201.

Figure 3:
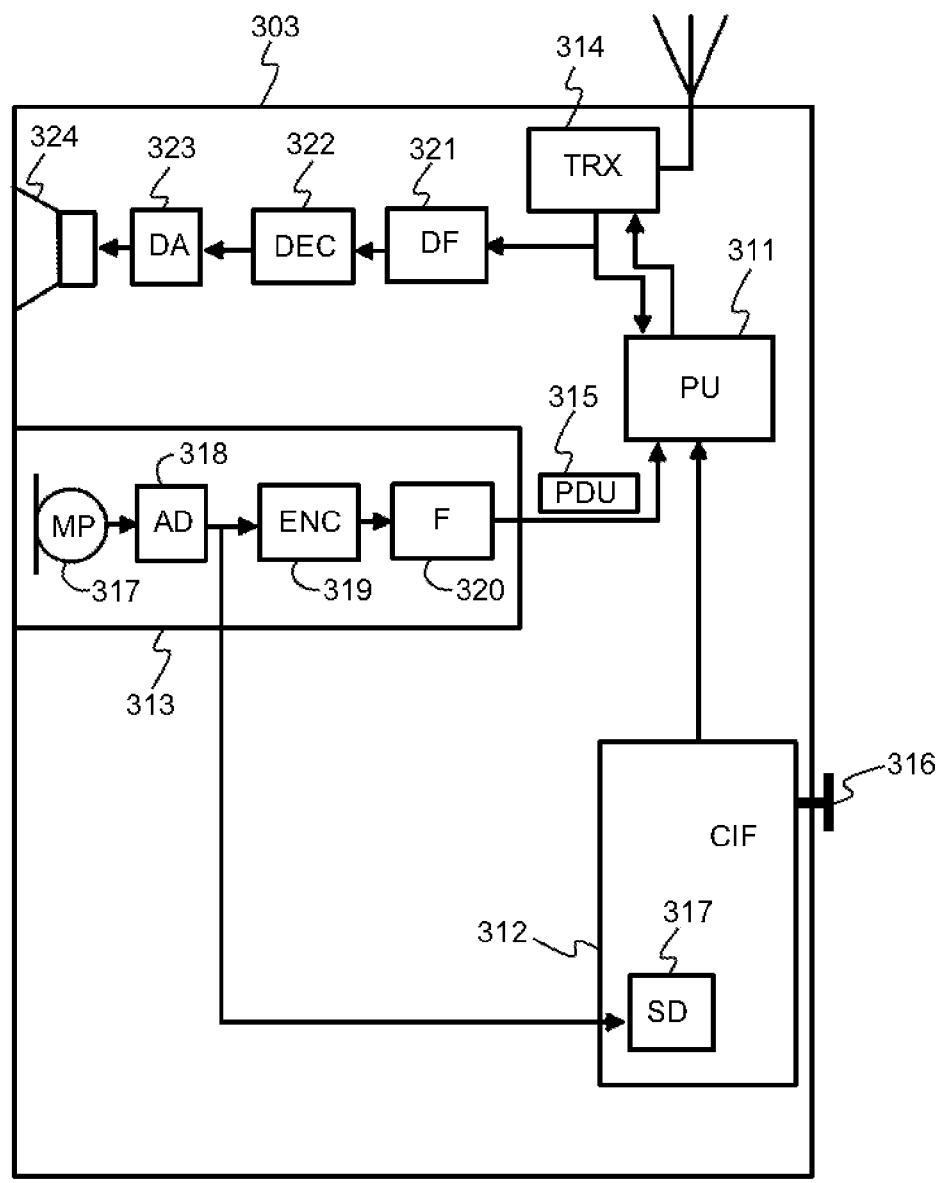
FIG. 3 shows a block diagram of a communication device according to an embodiment of the invention.

FIG. 3 shows a block diagram of a communication device 303 according to an embodiment of the invention. The communication device comprises a processor unit 311 that is arranged to run a routing protocol for including the communication device into an ad-hoc communication network. The communication device comprises a control interface 312 that is arranged to receive a pre-determined control action. The communication device comprises a circuitry 313 that is arranged to create a protocol data unit 315. The circuitry 313 comprises means for converting a voice signal into payloads of successive protocol data units. These means can include a microphone 317, an analog-to-digital converter 318, an encoder 319, and a framer unit 320 arranged to packetize a digital data stream into successive protocol data units. The circuitry 313 can comprise also means for packetizing image, video and/or some other kind of data into successive protocol data units. The protocol data units can be, for example, IP-packets (Internet protocol), Frame relay frames, or Ethernet frames. The communication device comprises a radio transmitter that is arranged to transmit the protocol data unit to the ad-hoc communication network. The radio transmitter is a part of a radio transceiver 314 (transmitterreceiver) that is capable of both transmitting protocol data units to the ad-hoc communication network and receiving protocol data units from the ad-hoc communication network. The processor unit 311 is arranged to provide the protocol data unit 315 with a pre-determined protocol address as a response to the predetermined control action, and otherwise, to provide the protocol data unit with another protocol address. The communication device can further comprise means for converting data carried by protocol data units into a voice signal. These means can include, for example, a de-framing unit 321 arranged to extract a digital data stream from successive protocol data units, a decoder 322, an digital-to-analog converter 323, and a speaker element 324.

In a communication device according to an embodiment of the invention the control interface 312 comprises a push button 316. Pressing of the push button is arranged to represent the pre-determined control action. Hence, the protocol data unit 315 is provided with the pre-determined protocol address if the push button is pressed. Otherwise the protocol data unit 315 is provided with another protocol address.

In a communication device according to an embodiment of the invention the control interface 312 comprises a speech detector 317. A first pre-determined voice command is arranged to represent a beginning of the pre-determined control action and a second pre-determined voice command is arranged to represent an end of the pre-determined control action. Hence, the protocol data unit 315 is provided with the pre-determined protocol address if the last reception of the first predetermined voice command has not been followed by a reception of the second pre-determined voice command. Otherwise the protocol data unit 315 is provided with another address.

In a communication device according to an embodiment of the invention the routing protocol is an IP-unicast protocol (Internet Protocol), the protocol data unit is an IP-packet, and an IP-destination address (DA) of the IP-packet is able to carry a value corresponding to the pre-determined protocol address.

In a communication device according to an embodiment of the invention the routing protocol is an IP-multicast protocol (Internet Protocol), the protocol data unit is an IP-packet, and an IP-multicast address (MA) of the IP-packet is able to carry a value corresponding to the pre-determined protocol address.

A communication device according to an embodiment of the invention is arranged to support full-duplex radio communication.

A communication device according to an embodiment of the invention is integrated with a breathing protection apparatus.

A communication device according to an embodiment of the invention is integrated with a helmet.

A communication device according to an embodiment of the invention is integrated with a wearable or handheld device.

Figure 4:
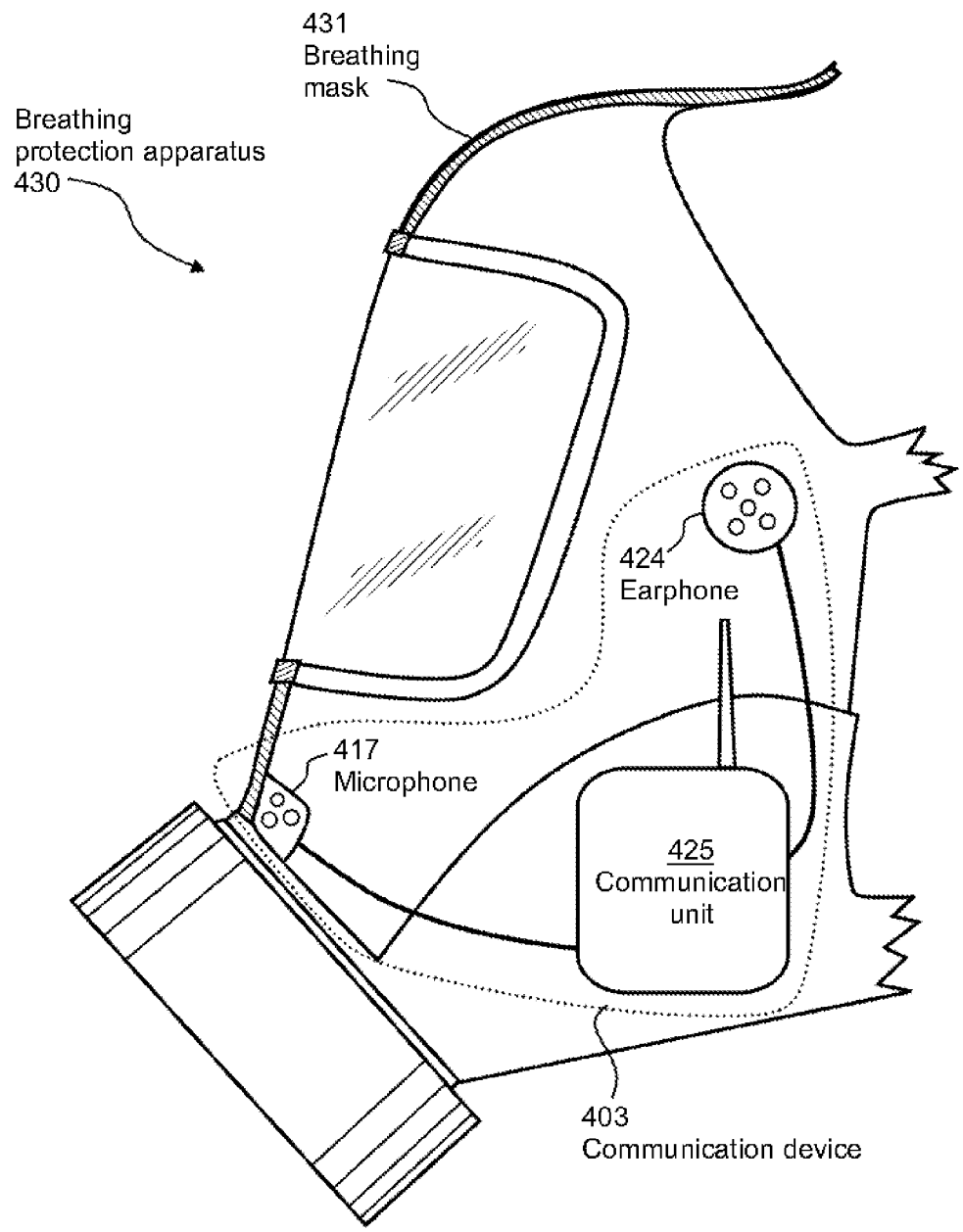
FIG. 4 shows a breathing protection apparatus according to an embodiment of the invention.

FIG. 4 shows a breathing protection apparatus 430 according to an embodiment of the invention. The breathing protection apparatus comprises a breathing mask 431 having an eye shield and a filter element that is arranged to filter the air inhaled by a wearer of the breathing protection apparatus. The breathing mask 431 is shown as a partial section view in FIG. 4. The breathing protection apparatus comprises a communication device 403 that includes a microphone 417, an earphone 424, and a communication unit 425. The microphone and the earphone are connected to the communication unit 425 via corded links. The communication unit 425 comprises:
  a processor unit arranged to run a routing protocol for including the communication device 403 into an ad-hoc communication network,
  a control interface arranged to receive a pre-determined control action,
  a circuitry arranged to create a protocol data unit, and a transmitter arranged to transmit the protocol data unit to the ad-hoc communication network.

The processor unit is arranged to provide the protocol data unit with a predetermined protocol address as a response to the pre-determined control action and otherwise to provide the protocol data unit with another protocol address. The control interface can comprise, for example, a speech detector that is coupled to the microphone 417. Therefore, a wearer of the breathing protection apparatus can perform the pre-determined control action by using a voice command.

Figure 5:
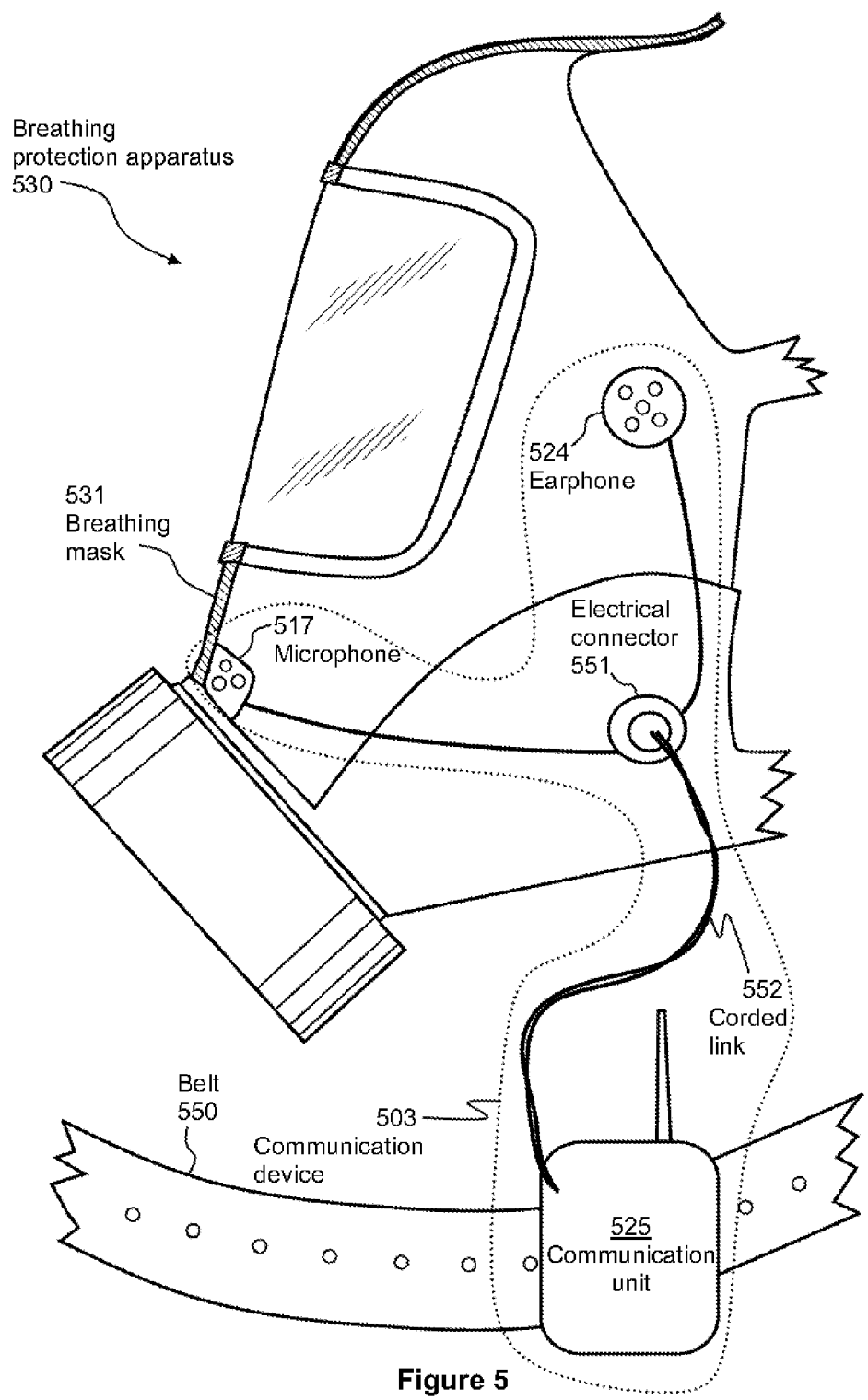
FIG. 5 shows a breathing protection apparatus according to an embodiment of the invention.

In the breathing protection apparatus shown in FIG. 4 the communication unit 425 is physically integrated with the breathing mask 431. An alternative construction for a breathing protection apparatus 530 is shown in FIG. 5. A communication unit 525 that preferably comprises similar means as the communication unit 425 shown in FIG. 4 is connected to a breathing mask 531 via a corded link 552. The communication unit 525 can be carried, for example, on a belt 550 of a wearer of the breathing protection apparatus 530. The corded link 552 and the breathing mask 531 have electrical connectors 551 that can be connected to each other. The breathing mask 531 comprises a microphone 517 and an earphone 524.

FIG. 6a shows a block diagram of a gateway device 607 according to an embodiment of the invention. The gateway device comprises a processor unit 611 that is arranged to run a routing protocol for including the gateway device into an ad-hoc communication network. The gateway device comprises a receiver 612 that is arranged to receive a protocol data 615 unit from the ad-hoc communication network. The gateway device comprises a transmitter 616 that is capable of relaying data carried by the protocol data unit to a permanent communication network, e.g. a mobile communication network, a landline network, or a combination of them. The processor unit 611 is arranged to relay the data carried by the protocol data unit to the permanent communication network as a response to a situation in which the protocol data unit is provided with a pre-determined protocol address. The gateway device can further comprise a transmitter 612 that is capable of transmitting protocol data unit to the ad-hoc communication network. The gateway device can further comprise a receiver 617 that is capable of receiving data from the permanent communication network.

A gateway device according an embodiment of the invention is arranged to support half-duplex communication with the permanent communication network and to support one of the following with the ad-hoc communication network: full-duplex communication and half-duplex communication.

In a gateway device according an embodiment of the invention the processor unit 611 is arranged:
to relay the data carried by the protocol data unit 615 to the permanent communication network as a response to a situation in which the protocol data unit is provided with the pre-determined protocol address and the gateway device is in a half-duplex transmission mode with respect to the permanent communication network, and
to send to the ad-hoc communication network an indication of channel unavailability as a response to a situation in which the protocol data 615 unit is provided with the pre-determined protocol address and the gateway device is in a half-duplex listening mode with respect to the permanent communication network.

The processor unit 611 can be further arranged:
to store an indicator of an attempted message into a buffer memory 660 as a response to the situation in which the protocol data unit 615 is provided with the pre-determined protocol address and the gateway device is in the half-duplex listening mode with respect to the permanent communication network, and
to send to the ad-hoc communication network an indication of channel availability as a response to a situation in which the buffer memory contains the indicator of attempted message and the gateway device is switched from the half-duplex listening mode to the half-duplex transmission mode with respect to the permanent communication network.

In a gateway device according an embodiment of the invention the processor unit 611 is arranged to set channel access priorities for communication devices of the ad-hoc communication network that are trying to access the permanent communication network. The channel access priorities can be set e.g. based on order of requests for channel access (first in, first out) or the channel access priorities can be defined as per communication device or the channel access priorities can be given to the communication devices by casting lots. Temporally successive indications of channel availability are sent to users of different communication devices in a temporal order determined by the channel access priorities of the respective communication devices.

In a gateway device according an embodiment of the invention the processor unit 611 is arranged to set priority between calls from the ad-hoc communication network to the permanent communication network and calls from the permanent communication network to the ad-hoc communication network. The calls from the permanent communication network to the ad-hoc communication network have preferably a better priority than the calls from the ad-hoc communication network to the permanent communication network for example in such a way that:
the gateway device is switched to the half-duplex listening mode with respect to the permanent communication network as a response to a situation in which the gateway device receives data from the permanent communication network,
the gateway device is kept in the half-duplex listening mode with respect to the permanent communication network as long as the gateway device receives data from the permanent communication network in spite of the fact that the gateway device may simultaneously receive data also from the ad-hoc communication network, and
the gateway device is switched to the half-duplex transmission mode with respect to the permanent communication network as a response to a situation in which the gateway device receives data only from the ad-hoc communication network.

It is also possible that the calls from the ad-hoc communication network to the permanent communication network have a better priority than the calls from the permanent communication network to the ad-hoc communication network.

In a gateway device according an embodiment of the invention the transmitter 616 is capable of relaying the data carried by the protocol data unit 615 to at least one of the following permanent communication networks: a mobile communication network and a landline network.

Figure 6B:
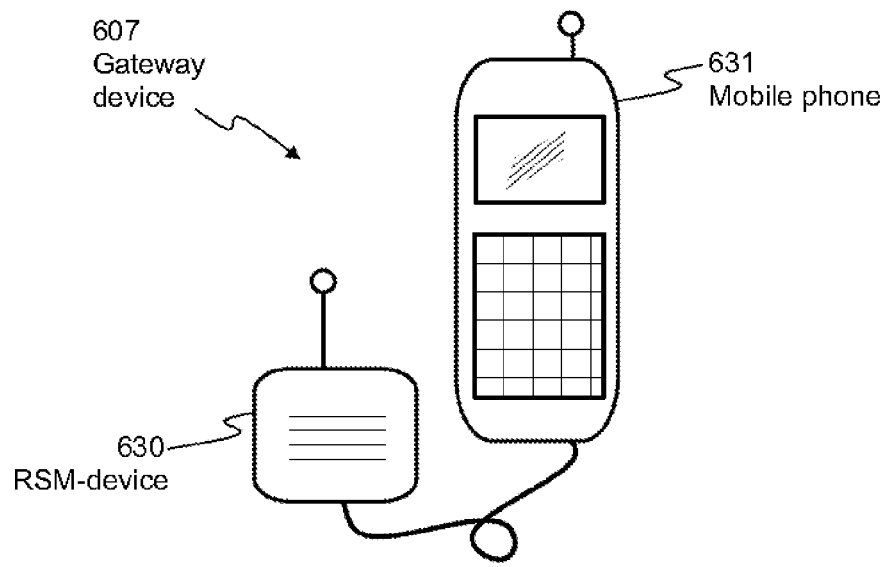
FIG. 6b shows an exemplifying gateway device according to an embodiment of the invention.

FIG. 6b shows an exemplifying gateway device according to an embodiment of the invention. The gateway device comprises an RSM-device 630 (Remote Speaker Microphone) and a mobile phone 631 that are connected to each other. The RSM-device includes the processor unit 611 and the receiver 612. The mobile phone includes the transmitter 616 that is capable of relaying the data carried by the protocol data unit to the permanent communication network. The RSM-device is connected to the mobile phone through a wired or wireless connection.

Figure 7:
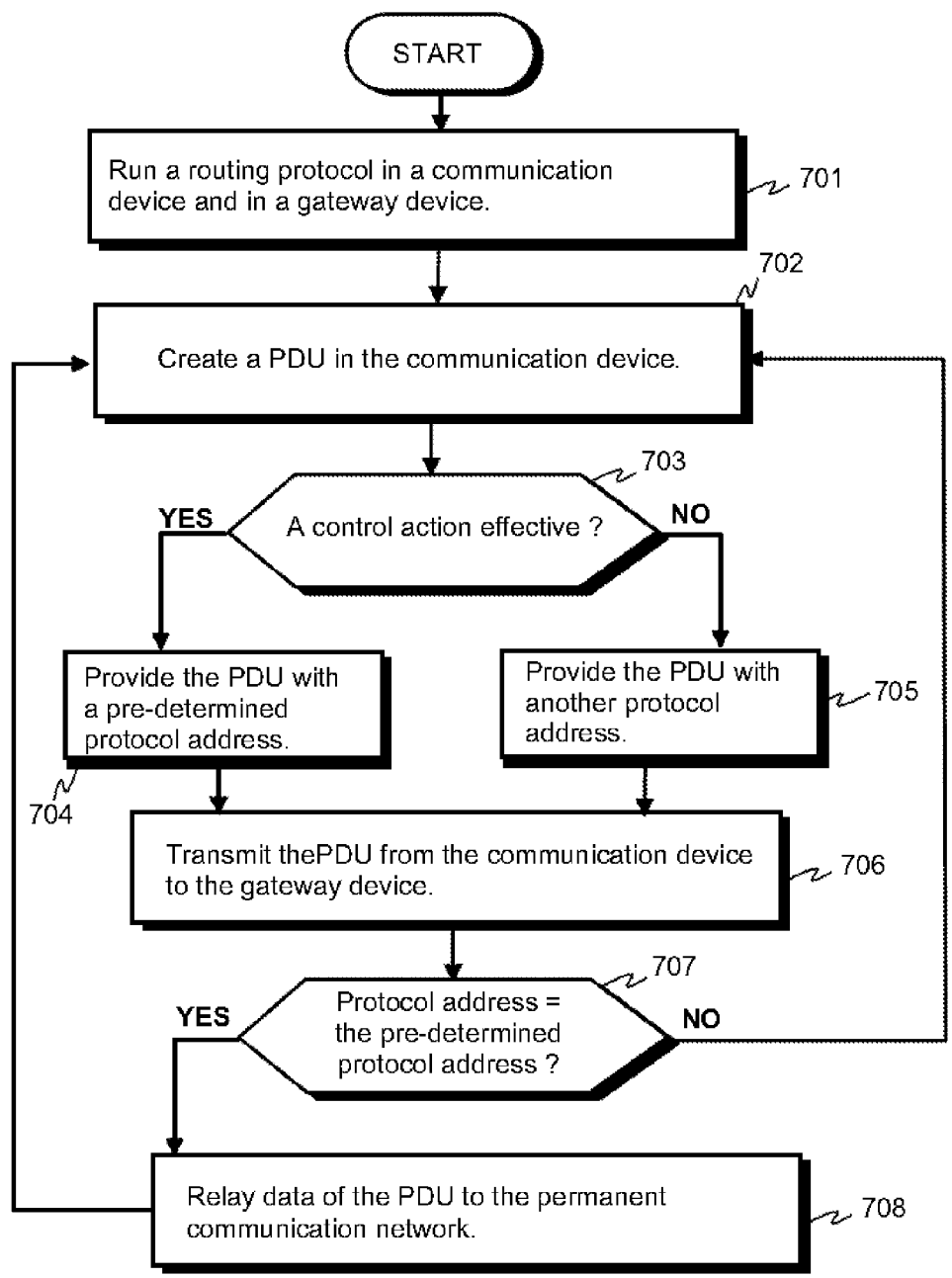
FIG. 7 is a flow chart of a method according to an embodiment of the invention for connecting an ad-hoc communication network to a permanent communication network.

FIG. 7 is a flow chart of a method according to an embodiment of the invention for connecting an ad-hoc communication network to a permanent communication network, e.g. a mobile communication network, a landline network, or a combination of them. A phase 701 comprises running a routing protocol in a communication device and in a gateway device for including the communication device and the gateway device into the ad-hoc communication network. A phase 702 comprises creating a protocol data unit (PDU) in the communication device. In a selection phase 703 it is checked whether a pre-determined control action is effective. If the pre-determined control action is effective (the YES-branch), the protocol data unit is provided with a pre-determined protocol address, a phase 704. If the predetermined control action is not effective (the NO-branch), the protocol data unit is provided with another protocol address, a phase 705. A phase 706 comprises transmitting the protocol data unit from the communication device to the gateway device via the ad-hoc communication network. In a selection phase 707 it is checked whether the protocol data unit has been provided with the pre-determined protocol address. If the protocol data unit has been provided with the predetermined protocol address (the YES-branch), data carried by the protocol data unit is relayed from the gateway device to the permanent communication network, a phase 708.

In a method according to an embodiment of the invention pressing of a push button of the communication device represents the pre-determined control action.

In a method according to an embodiment of the invention a speech detector is used for interpreting voice commands and a first pre-determined voice command represents a beginning of the pre-determined control action and a second predetermined voice command represents an end of the pre-determined control action.

In a method according to an embodiment of the invention a transmitter of a mobile phone is used for relaying the data carried by the protocol data unit to the permanent communication network.

In a method according to an embodiment of the invention the communication device is integrated with a breathing protection apparatus.

In a method according to an embodiment of the invention the communication device is integrated with a helmet.

In a method according to an embodiment of the invention the communication device is integrated with a wearable or handheld device.

In a method according to an embodiment of the invention an IP-unicast protocol (Internet Protocol) is used as the routing protocol, the protocol data unit is an IP-packet, and an IP-destination address (DA) of the IP-packet is able to carry a value corresponding to the pre-determined protocol address.

In a method according to an embodiment of the invention an IP-multicast protocol (Internet Protocol) is used as the multicast routing protocol, the protocol data unit is an IP-packet, and an IP-multicast address (MA) of the IP-packet is able to carry a value corresponding to the pre-determined protocol address.

In a method according to an embodiment of the invention full-duplex communication is supported between the communication device and the gateway device, and full duplex communication is supported between the gateway device and the permanent communication network.

In a method according to an embodiment of the invention the data carried by the protocol data unit is relayed to at least one of the following permanent communication networks: a mobile communication network and a landline network.

Figure 8:
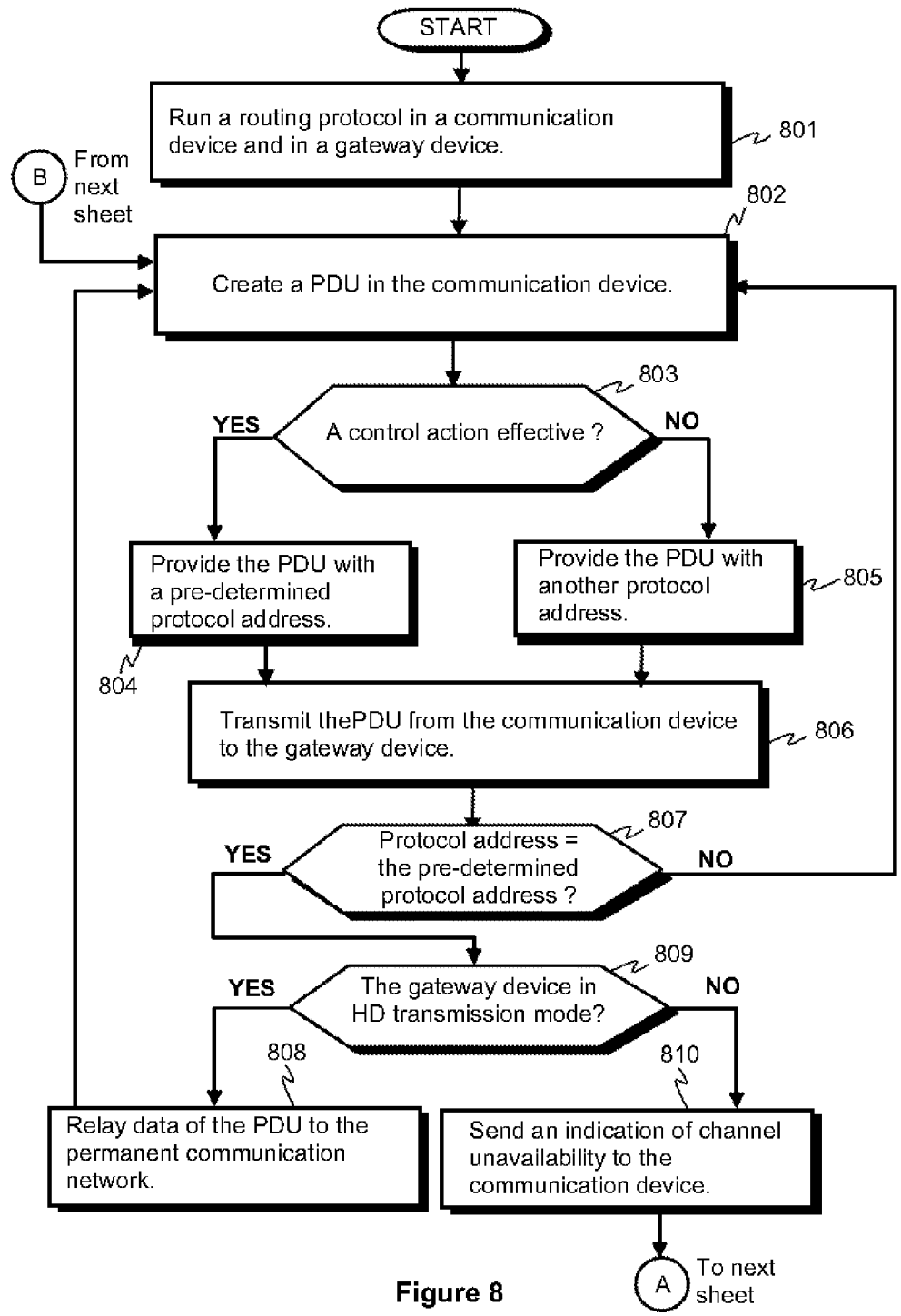
FIG. 8 is a flow chart of a method according to an embodiment of the invention for connecting an ad-hoc communication network to a permanent communication network.
Figure 8:
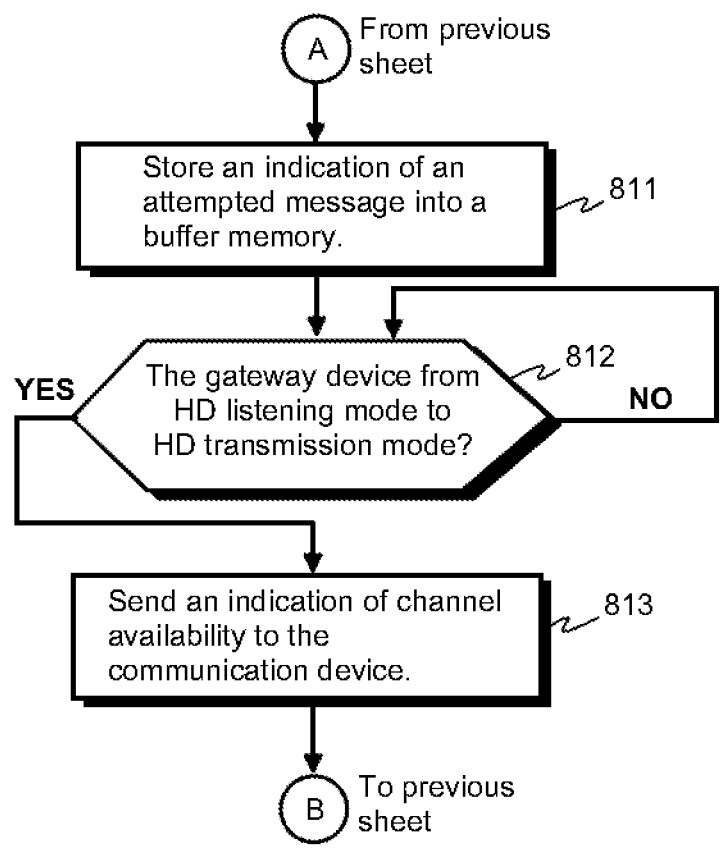

In a method according to an embodiment of the invention half-duplex communication is supported between the gateway device and the permanent communication network, and one of the following is supported between the communication device and the gateway device: full-duplex communication and half-duplex communication. FIG. 8 is a flow chart of a method according to this embodiment of the invention for connecting an ad-hoc communication network to a permanent communication network.

A phase 801 comprises running a routing protocol in a communication device and in a gateway device for including the communication device and the gateway device into the ad-hoc communication network. A phase 802 comprises creating a protocol data unit (PDU) in the communication device. In a selection phase 803 it is checked whether a pre-determined control action is effective. If the predetermined control action is effective (the YES-branch), the protocol data unit is provided with a pre-determined protocol address, a phase 804. If the predetermined control action is not effective (the NO-branch), the protocol data unit is provided with another protocol address, a phase 805. A phase 806 comprises transmitting the protocol data unit from the communication device to the gateway device via the ad-hoc communication network. In a selection phase 807 it is checked whether the protocol data unit has been provided with the pre-determined protocol address. If the protocol data unit has been provided with the predetermined protocol address (the YES-branch), it is checked in the selection phase 809 whether the gateway device is in a half-duplex transmission mode with respect to the permanent communication network. If the gateway device is in the half-duplex transmission mode (the YES-branch), data carried by the protocol data unit is relayed from the gateway device to the permanent communication network, a phase 808. If the gateway device is in a half-duplex listening mode (the NO-branch), an indication of channel unavailability is sent the communication device, a phase 810. On the basis of the indication of channel unavailability a user of the communication device is able to know that, for the moment, it is not possible to transmit data to the permanent communication network. A phase 811 comprises storing an indicator of an attempted message into a buffer memory. With the aid of the indicator of an attempted message it is possible to send a notification (an indication of channel availability) to a user of the communication device when the gateway device has been switched from the half-duplex listening mode to the half-duplex transmission mode. On the basis of the channel availability indicator the user of the communication device is able to know that it is again possible to transmit data to the permanent communication network. In a selection phase 812 it is checked whether the gateway device is switched from the half-duplex listening mode to the half-duplex transmission mode. If the gateway device is switched from the half-duplex listening mode to the half-duplex transmission mode (the YES-branch), the indication of channel availability is sent to the communication device, a phase 813. Temporally successive indications of channel availability that are related to temporally successive changes from the half-duplex listening mode to the half-duplex transmission mode can be sent to users of different communication devices according to the FIFO-discipline (First In-First Out). In other words, a user that has made an earlier attempt to transmit data to the permanent communication network will receive an earlier indication of channel availability than a user that has made a later attempt to transmit data to the permanent communication network.

In a method according to an embodiment of the invention the temporally successive indications of channel availability are sent to users of different communication devices in a temporal order determined by channel access priorities of the communication devices, the channel access priorities being based on a predetermined rule. The channel access priorities can be based, for example, on types of the communication devices and/or on profiles of the users of the communication devices. The pre-determined rule according to which the channel access priorities are determined can be dynamically altered e.g. in a case-by-case manner.

In a method according to an embodiment of the invention, calls from the permanent communication network to the ad-hoc communication network have a better priority than calls from the ad-hoc communication network to the permanent communication network for example in such a way that:

the gateway device is switched to the half-duplex listening mode with respect to the permanent communication network as a response to a situation in which the gateway device receives data from the permanent communication network, the gateway device is kept in the half-duplex listening mode with respect to the permanent communication network as long as the gateway device receives data from the permanent communication network in spite of the fact that the gateway device may simultaneously receive data also from the ad-hoc communication network, and the gateway device is switched to the half-duplex transmission mode with respect to the permanent communication network as a response to a situation in which the gateway device receives data only from the ad-hoc communication network.

In a method according to another embodiment of the invention, calls from the ad-hoc communication network to the permanent communication network have a better priority than calls from the permanent communication network to the ad-hoc communication network for example in such a way that:

the gateway device is switched to the half-duplex transmission mode with respect to the permanent communication network as a response to a situation in which the gateway device receives data from the ad-hoc communication network, the gateway device is kept in the half-duplex transmission mode with respect to the permanent communication network as long as the gateway device receives data from the ad-hoc communication network in spite of the fact that the gateway device may simultaneously receive data also from the permanent communication network, and the gateway device is switched to the half-duplex listening mode with respect to the permanent communication network as a response to a situation in which the gateway device receives data only from the permanent communication network.

While there have been shown and described and pointed out fundamental novel features of the invention as applied to embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. The specific examples provided in the description given above should not be construed as limiting. Therefore, the invention is not limited merely to the embodiments described above, many variants being possible without departing from the scope of the inventive idea defined in the independent claims.

What is claimed is:

1. A system for connecting an ad-hoc communication network to a permanent communication network, the arrangement comprising:

a communication device that includes a processor unit arranged to run a routing protocol for including the communication device into the ad-hoc communication network, a control interface arranged to receive a predetermined control action given by a user of the communication device, a circuitry arranged to create a protocol data unit, and a transmitter arranged to transmit the protocol data unit to the ad-hoc communication network; and a gateway device that includes a processor unit arranged to run the routing protocol for including the gateway device into the ad-hoc communication network, a receiver arranged to receive the protocol data unit, and a transmitter capable of relaying data carried by the protocol data unit to the permanent communication network, wherein the processor unit of the communication device is arranged to provide the protocol data unit with a predetermined protocol address as a response to the predetermined control action, and otherwise, to provide the protocol data unit with another protocol address, and the processor unit of the gateway device is arranged to relay the data carried by the protocol data unit to the permanent communication network as a response to a situation in which the protocol data unit is provided with the predetermined protocol address.

2. The system according to claim 1, wherein the control interface of the communication device comprises a push button and pressing of the push button is arranged to represent the predetermined control action.

3. The system according to claim 1, wherein the control interface of the communication device comprises a speech detector and a first predetermined voice command is arranged to represent a beginning of the predetermined control action and a second predetermined voice command is arranged to represent an end of the predetermined control action.

4. The system according to claim 1, wherein the gateway device comprises a mobile phone that includes the transmitter capable of relaying the data carried by the protocol data unit to the permanent communication network.

5. The system according to claim 1, wherein the communication device is integrated with one of the following: a breathing protection apparatus, a helmet, or a wearable device.

6. The system according to claim 1, wherein the routing protocol is an IP-multicast protocol (Internet Protocol) and the protocol data unit is an IP-packet.

7. The system according to claim 1, wherein the routing protocol is an IP-unicast protocol (Internet Protocol) and the protocol data unit is an IP-packet.

8. The system according to claim 1, wherein the communication device is arranged to support full-duplex communication with the gateway device and the gateway device is arranged to support full-duplex communication with the permanent communication network.

9. The system according to claim 8, wherein the processor unit of the gateway device is arranged:

to relay the data carried by the protocol data unit to the permanent communication network as a response to a situation in which the protocol data unit is provided with the predetermined protocol address and the gateway device is in a half-duplex transmission mode with respect to the permanent communication network, and to send to the communication device an indication of channel unavailability as a response to a situation in which the protocol data unit is provided with the predetermined protocol address and the gateway device is in a half-duplex listening mode with respect to the permanent communication network.

10. The system according to claim 9, wherein the processor unit of the gateway device is further arranged:
to store an indicator of an attempted message into a buffer memory of the gateway device as a response to the situation in which the protocol data unit is provided with the predetermined protocol address and the gateway device is in the half-duplex listening mode with respect to the permanent communication network, and
to send to the communication device an indication of channel availability as a response to a situation in which the buffer memory contains the indicator of attempted message and the gateway device is switched from the half-duplex listening mode to the half-duplex transmission mode with respect to the permanent communication network.

11. The system according to claim 1, wherein the gateway device is arranged to support half-duplex communication with the permanent communication network and the communication device is arranged to support one of the following with the gateway device: full-duplex communication or half-duplex communication.

12. The system arrangement according to claim 1, wherein the transmitter of the gateway device is capable of relaying the data carried by the protocol data unit to at least one of the following permanent communication networks: a mobile communication network or a landline network.

13. A communication device comprising:
a processor unit arranged to run a routing protocol for including the communication device into an ad-hoc communication network;
a control interface arranged to receive a predetermined control action given by a user of the communication device;
a circuitry arranged to create a protocol data unit; and
a transmitter arranged to transmit the protocol data unit to the ad-hoc communication network,
wherein the processor unit is arranged to provide the protocol data unit with a predetermined protocol address as a response to the predetermined control action, and otherwise, to provide the protocol data unit with another protocol address, and the control interface comprises at least one of the following: a) a push button and pressing of the push button is arranged to represent the predetermined control action, b) a speech detector and a first predetermined voice command is arranged to represent a beginning of the predetermined control action and a second predetermined voice command is arranged to represent an end of the predetermined control action.

14. The communication device according to claim 13, wherein the routing protocol is an IP-multicast protocol (Internet Protocol) and the protocol data unit is an IP-packet.

15. The communication device according to claim 13, wherein the routing protocol is an IP-unicast protocol (Internet Protocol) and the protocol data unit is an IP-packet.

16. The communication device according to claim 13, wherein the communication device is arranged to support full-duplex radio communication.

17. The communication device according to claim 13, wherein the communication device is integrated with one of the following: a breathing protection apparatus, a helmet, or a wearable device.

18. A breathing protection apparatus comprising a breathing mask and a communication device that comprises:
a processor unit arranged to run a routing protocol for including the communication device into an ad-hoc communication network;
a control interface arranged to receive a predetermined control action;
a circuitry arranged to create a protocol data unit; and
a transmitter arranged to transmit the protocol data unit to the ad-hoc communication network;
wherein the processor unit is arranged to provide the protocol data unit with a pre-determined protocol address as a response to the predetermined control action, and otherwise, to provide the protocol data unit with another protocol address, and the control interface comprises at least one of the following: a) a push button and pressing of the push button is arranged to represent the predetermined control action, b) a speech detector and a first predetermined voice command is arranged to represent a beginning of the predetermined control action and a second predetermined voice command is arranged to represent an end of the predetermined control action.

19. A method for connecting an ad-hoc communication network to a permanent communication network, the method comprising:
running a routing protocol in a communication device and in a gateway device for including the communication device and the gateway device into the ad-hoc communication network;
creating a protocol data unit in the communication device;
in the communication device, providing the protocol data unit with a predetermined protocol address as a response to a predetermined control action given by a user of the communication device, and otherwise, providing the protocol data unit with another protocol address;
transmitting the protocol data unit from the communication device to the gateway device via the ad-hoc communication network; and
relaying, in the gateway device, data carried by the protocol data unit to the permanent communication network as a response to a situation in which the protocol data unit is provided with the predetermined protocol address.

20. The method according to claim 19, wherein pressing of a push button of the communication device represents the predetermined control action.

21. The method according to claim 19, wherein a speech detector is used for interpreting voice commands and a first predetermined voice command represents a beginning of the predetermined control action and a second predetermined voice command represents an end of the predetermined control action.

22. The method according to claim 19, wherein a transmitter of a mobile phone is used for relaying the data carried by the protocol data unit to the permanent communication network.

23. The method according to claim 19, wherein the communication device is integrated with one of the following: a breathing protection apparatus and a helmet.

24. The method according to claim 19, wherein an IP-multicast protocol (Internet Protocol) is used as the routing protocol and the protocol data unit is an IP-packet.

25. The method according to claim 19, wherein an IP-unicast protocol (Internet Protocol) is used as the routing protocol and the protocol data unit is an IP-packet.

26. The method according to claim 19, wherein full-duplex communication is supported between the communication device and the gateway device, and full duplex communication is supported between the gateway device and the permanent communication network.

27. The method according to claim 19, wherein half-duplex communication is supported between the gateway device and the permanent communication network, and one of the following is supported between the communication device and the gateway device: full-duplex communication and half-duplex communication.

28. The method according to claim 27, wherein the method further comprises:

relaying, in the gateway device, the data carried by the protocol data unit to the permanent communication network as a response to a situation in which the protocol data unit is provided with the predetermined protocol address and the gateway device is in a half-duplex transmission mode with respect to the permanent communication network; or sending from the gateway device to the communication device an indication of channel unavailability as a response to a situation in which the protocol data unit is provided with the predetermined protocol address and the gateway device is in a half-duplex listening mode with respect to the permanent communication network.

29. The method according to claim 28, wherein the method further comprises:

storing an indicator of an attempted message into a buffer memory of the gateway device as a response to the situation in which the protocol data unit is provided with the predetermined protocol address and the gateway device is in the half-duplex listening mode with respect to the permanent communication network; and sending from the gateway device to the communication device an indication of channel availability as a response to a situation in which the buffer memory contains the indicator of attempted message and the gateway device is switched from the half-duplex listening mode to the half-duplex transmission mode with respect to the permanent communication network.

30. The method according to claim 19, wherein the data carried by the protocol data unit is relayed to at least one of the following permanent communication networks: a mobile communication network and a landline network.

* * * * *

UNITED STATES PATENT AND TRADEMARK OFFICE
CERTIFICATE OF CORRECTION

PATENT NO. : 8,665,760 B2
APPLICATION NO. : 12/863507
DATED : March 4, 2014
INVENTOR(S) : Sinivaara et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 649 days.

Signed and Sealed this
Twenty-ninth Day of September, 2015

Michelle K. Lee
*Director of the United States Patent and Trademark Office*